United States Patent [19]

Fukushima

[11] 4,361,772
[45] Nov. 30, 1982

[54] MICRO STEPPING MOTOR FOR ELECTRONIC WATCHES

[75] Inventor: Yasuhiro Fukushima, Ichikawa, Japan

[73] Assignee: Kabushiki Kaisha Daini Seikosha, Japan

[21] Appl. No.: 119,786

[22] Filed: Feb. 8, 1980

Related U.S. Application Data

[60] Division of Ser. No. 48,187, Jun. 13, 1979, which is a continuation of Ser. No. 761,437, Jan. 21, 1977, abandoned, which is a division of Ser. No. 556,200, Mar. 6, 1975, abandoned.

[30] Foreign Application Priority Data

Aug. 29, 1974 [JP] Japan ................... 49/103672[U]

[51] Int. Cl.³ ............................................. H02K 37/00
[52] U.S. Cl. .................................. 310/49 R; 310/162; 310/193
[58] Field of Search ...................... 310/49, 162–165, 310/172, 190–193; 368/161–163

[56] References Cited

U.S. PATENT DOCUMENTS

| 2,709,762 | 5/1955 | Naul | 310/172 |
| 2,909,685 | 10/1959 | Szabo | 310/163 X |
| 3,142,774 | 7/1964 | Lundin | 310/163 X |
| 4,041,336 | 8/1977 | Sudler et al. | 310/49 |
| 4,262,223 | 4/1981 | Cleusix | 310/49 |
| 4,277,704 | 7/1981 | Giger et al. | 310/49 |

Primary Examiner—Donovan F. Duggan
Attorney, Agent, or Firm—Robert E. Burns; Emmanuel J. Lobato; Bruce L. Adams

[57] ABSTRACT

A micro stepping motor for driving the hands of an analog electronic watch comprises a coil wound on a magnetic core, a magnetic stator connected to the core to define therewith a magnetic flux path, and a magnetized rotor rotatably disposed in an opening of the stator. The magnetic core has a higher saturated magnetic flux density and a smaller size than that of the magnetic stator thereby enabling construction of motors of smaller size and higher electric power efficiency than would otherwise be possible if the magnetic core and stator had the same value of saturated magnetic flux density.

5 Claims, 2 Drawing Figures

MICRO STEPPING MOTOR FOR ELECTRONIC WATCHES

RELATED APPLICATIONS

This application is a division of application Ser. No. 48,187 filed June 13, 1979, which is a continuation of application Ser. No. 761,437 filed Jan. 21, 1977 and now abandoned, which in turn is a division of application Ser. No. 556,200 filed Mar. 6, 1975 and now abandoned.

BACKGROUND OF THE INVENTION

The present invention pertains generally to micro stepping motors, and more particularly to micro stepping motors used as electro-mechanical transducers in electronic analog wristwatches.

For purposes of facilitating an understanding and appreciation of the present invention, a brief description will first be given of one embodiment of micro stepping motor according to the invention disclosed and claimed in one of the earlier related applications listed above. One such embodiment of micro stepping motor used for driving the watch hands of an analog electronic wristwatch is shown in FIG. 1 and comprises a magnetic core 1 having wound thereon a coil 2, a stator 3 having opposite ends connected to the respective ends of the magnetic core 1 to define therewith a closed magnetic flux path, and a rotor 4 having a set of magnetic poles rotatably disposed within a hole in the stator 3. In this embodiment, the stator 3 has a constricted region of reduced cross-sectional area defined by concavely shaped connecting portions 3a, 3b and the hole in the stator for housing the rotor is located in the constricted region. A pair of recesses 5a, 5b are provided in the stator at diametrically opposite sites around the circumference of the hole for determining the rotor rest or stationary positions.

In the micro stepping motor embodiment shown in FIG. 1, the stator 3 and the core 1 are made of the same material thereby necessitating that the core 1 be made sufficiently large in total cross-section so as to obtain the required magnetic flux capacity during motor operation to apply the driving torque to the rotor 4 and to quickly magnetically saturate the stator connecting portions 3a, 3b. The cross-sectional area of the magnetic core 1 is designated $S_1$. Therefore when the core and stator are composed of the same material, the core must have a sufficiently large cross-sectional area to meet the magnetic flux requirements for proper motor operation.

During operation, pulses of alternate polarity are applied to the coil 2 and the resulting magnetic fluxes generated by the coil flow in alternate directions through the stator 3. As the magnetic flux alternately flows through the stator constricted region defined by the connecting portions 3a, 3b, the narrow connecting portions quickly magnetically saturate and when in the saturated state function as air gaps diverting flux (leakage flux) to the stator hole to rotationally drive the rotor 4.

SUMMARY OF THE INVENTION

It is, therefore, a primary object of the present invention to provide a micro stepping motor which can be made smaller in size than comparable motors yet which exhibits the favorable operating characteristics of the comparable motors.

It is another object of the present invention to provide a micro stepping motor having improved electric power efficiency as compared to comparable motors.

It is a further object of the present invention to provide a micro stepping motor having a magnetic core composed of material having a higher saturated magnetic flux density than the material of the stator thereby enabling construction of motors of smaller size and higher efficiency than would otherwise be possible if the magnetic core and stator were composed of the same material.

A still further object of the present invention is to provide an electronic watch incorporating such a micro stepping motor thereby enabling construction of smaller sized watches.

The above and other objects of the invention are achieved by a micro stepping motor comprised of a magnetic core having a coil wound thereon, a stator connected to the core and having a hole therein in which is rotatably mounted a rotor. The magnetic core is composed of material having a higher saturated magnetic flux density than the material of the stator so that the core may be made smaller in cross-sectional area than would otherwise be possible if the core and stator were composed of the same material while retaining the desired motor operating characteristics.

DESCRIPTION OF THE PREFERRED EMBODIMENT

Figure 1:
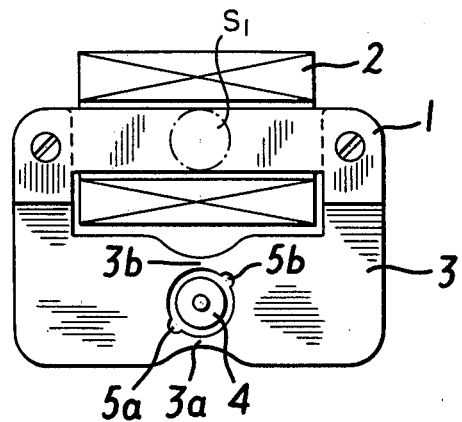
FIG. 1 is a plan view of a micro stepping motor in which the core and stator are composed of the same material.
Figure 2:
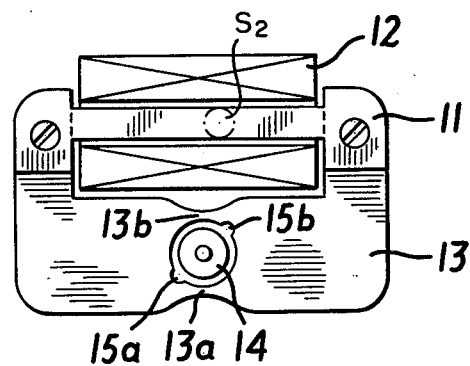
FIG. 2 is a plan view of a micro stepping motor in which the core is composed of material having a higher saturated magnetic flux density than the material of the stator.

As shown in FIG. 2, the micro stepping motor of the invention is generally similar to the motor shown in FIG. 1 except that the motor core is composed of a material of higher saturated magnetic flux density than the material of the stator and consequently, the core is of smaller cross-sectional area than the motor core shown in FIG. 1. More particularly, the motor comprises a magnetic core 11 having wound therearound a coil 12. A stator 13 has opposite end portions connected to respective ends of the magnetic core to define therewith a closed magnetic flux path. The stator 13 has a constricted region of reduced cross-sectional area defined by concavely shaped connecting portions 13a, 13b. An opening in the form of a hole is formed in the stator at the constricted region and a rotor 14 having a set of magnetic poles is rotatably mounted in the opening for rotation about a given axis. A pair of recesses 15a, 15b are provided in the stator at diametrically opposite sites around the circumference of the hole for determining the rotor rest or stationary positions.

In accordance with the invention, the material of the magnetic core 11 has a higher saturated magnetic flux density than the material of the stator 13 and as a consequence, the cross-sectional area $S_2$ of the core can be significantly reduced in size as compared to cores employed in motors in which the stator and core are composed of the same material having the same value of saturated magnetic flux density. This is shown in FIGS. 1 and 2 with the cross-sectional area $S_2$ being considerably smaller than the cross-sectional area $S_1$. Since, according to the invention, the magnetic core has a higher saturated magnetic flux density than that of the stator, the core may be correspondingly reduced in cross-sectional area while still having sufficient saturated magnetic flux capacity to quickly saturate the constricted region 13a,13b of the stator 13 without adversely affecting motor performance. Further, when the cross-sectional area of the core is made smaller, the sectional area of the coil wound on the core is likewise smaller in size as is the overall volume of the coil. This can be appreciated by comparing FIGS. 1 and 2 from which it can be seen that the micro stepping motor shown in FIG. 2 is smaller in overall size and more compact than the motor shown in FIG. 1 thereby enabling construction of a smaller and more compact electronic wristwatch by use of the motor shown in FIG. 2 than would be possible by using the motor shown in FIG. 1.

In accordance with a further feature of the present invention, the use of a magnetic core having a higher saturated magnetic flux density than that of the stator enables construction of a motor having improved electric power efficiency as compared to motors employing cores and stators of the same material. Again, by comparing the motors shown in FIGS. 1 and 2, it can be appreciated that when using a core of reduced cross-sectional area such as shown in FIG. 2, each turn of the coil 12 is smaller and hence has less resistance than the corresponding turn of the coil 2 shown in FIG. 1. Thus the coil 12 has a higher winding efficiency than the coil 2. Moreover, it is a fundamental principle of magnetic circuits that the magnetomotive force of a coil is proportional to the ampere-turns NI so that by reducing the cross-sectional area of the core, more turns of the coil can be wound on the core thereby improving the electric power efficiency.

I claim:
1. A micro stepping motor for electronic wristwatches and the like comprising: a magnetic core; a coil wound on said core; a magnetic stator connected to said core to define therewith a magnetic flux path and having means defining a rotor opening; a rotor having a set of magnetic poles and being rotatably disposed in the rotor opening; and wherein said core and stator are comprised of different magnetic materials, the material comprising said core having a higher saturated magnetic flux density than the material comprising said stator.

2. A micro stepping motor according to claim 1; further including means disposed at the rotor opening and coacting with the rotor for determining the rotor rest or stationary positions.

3. A micro stepping motor according to claim 1; wherein said means comprising two recessed portions of said stator located at diametrically opposite sites around the rotor opening.

4. A micro stepping motor according to claim 1; wherein said stator comprises a one-piece stator having along its length a region of reduced cross-sectional area, said rotor opening being located at said region.

5. In an analog electronic watch having a set of hands: a micro stepping motor according to any one of claims 1, 2, 3 or 4 for driving the set of hands.

* * * * *